United States Patent
Haub

(10) Patent No.: US 9,667,283 B2
(45) Date of Patent: *May 30, 2017

(54) METHOD AND APPARATUS FOR TRANSMITTER OPTIMIZATION BASED ON ALLOCATED TRANSMISSION BAND

(71) Applicant: Spreadtrum Communications USA Inc., San Diego, CA (US)

(72) Inventor: David Haub, San Diego, CA (US)

(73) Assignee: SPREADTRUM COMMUNICATIONS USA, INC., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/098,097

(22) Filed: Apr. 13, 2016

(65) Prior Publication Data

US 2016/0233898 A1    Aug. 11, 2016

Related U.S. Application Data

(60) Continuation of application No. 14/696,265, filed on Apr. 24, 2015, now Pat. No. 9,326,288, which is a
(Continued)

(51) Int. Cl.
| | |
|---|---|
| *H04K 1/02* | (2006.01) |
| *H04B 1/04* | (2006.01) |
| *H04W 72/04* | (2009.01) |
| *H04L 5/00* | (2006.01) |
| *H04W 72/08* | (2009.01) |

(Continued)

(52) U.S. Cl.
CPC ............ *H04B 1/0475* (2013.01); *H04L 5/00* (2013.01); *H04L 5/0007* (2013.01); *H04L 5/0064* (2013.01); *H04L 5/0085* (2013.01); *H04W 24/02* (2013.01); *H04W 72/0453* (2013.01); *H04W 72/082* (2013.01); *H04W 88/10* (2013.01)

(58) Field of Classification Search
CPC .................................................. H04W 72/0453
USPC ......................................................... 375/296
See application file for complete search history.

(56) References Cited

U.S. PATENT DOCUMENTS

| | | |
|---|---|---|
| 4,423,519 A | 12/1983 | Bennett, Jr. et al. |
| 5,125,105 A | 6/1992 | Kennedy et al. |

(Continued)

OTHER PUBLICATIONS

International Search Report and Written Opinion was issued on Feb. 3, 2014 for International Application No. PCT/US13/69434 which was filed on Nov. 11, 2013 and published as WO 2014/105273 on Jul. 3, 2014 (Inventor—David Haub) (7 pages).

(Continued)

*Primary Examiner* — Lihong Yu
(74) *Attorney, Agent, or Firm* — Ballard Spahr LLP

(57) ABSTRACT

First and second inputs are received. The first input indicates a frequency offset of a frequency band allocated for signal transmission. The said allocated band is a subband of a total band available for transmission. The second input indicates a bandwidth of the allocated band. One or more filters of a transmitter of a communications system are controlled to operate cumulatively in a lowpass filtering mode, wherein the highest frequency in a pass band in the lowpass filtering mode is less than the highest frequency of the total band available for transmission. A signal is filtered using the filter(s).

16 Claims, 15 Drawing Sheets

Related U.S. Application Data division of application No. 13/730,127, filed on Dec. 28, 2012, now Pat. No. 9,031,567.

(51) Int. Cl.
  *H04W 24/02* (2009.01)
  *H04W 88/10* (2009.01)

(56) References Cited

U.S. PATENT DOCUMENTS

| | | | |
|---|---|---|---|
| 6,118,339 | A | 9/2000 | Gentzler et al. |
| 6,140,874 | A | 10/2000 | French et al. |
| 6,144,255 | A | 11/2000 | Patel et al. |
| 6,147,555 | A | 11/2000 | Posner et al. |
| 6,639,939 | B1 | 10/2003 | Naden et al. |
| 6,731,953 | B1 | 5/2004 | McGowan et al. |
| 9,031,567 | B2 | 5/2015 | Haub |
| 9,326,288 | B2 * | 4/2016 | Haub .................. H04L 5/00 |
| 2002/0080744 | A1 | 6/2002 | Ozluturk |
| 2003/0053562 | A1 | 3/2003 | Busson et al. |
| 2003/0139148 | A1 | 7/2003 | Damgaard et al. |
| 2005/0079838 | A1 | 4/2005 | Li et al. |
| 2005/0272385 | A1 | 12/2005 | Nagano et al. |
| 2007/0173202 | A1 | 7/2007 | Binder et al. |
| 2007/0280338 | A1 | 12/2007 | Haub et al. |
| 2011/0069798 | A1 | 3/2011 | Lo et al. |
| 2012/0106674 | A1 | 5/2012 | Lee |
| 2012/0140802 | A1 | 6/2012 | Sutton |

OTHER PUBLICATIONS

International Preliminary Report on Patentability was issued on Jun. 30, 2015 for International Application No. PCT/US13/69434 which was filed on Nov. 11, 2013 and published as WO 2014/105273 on Jul. 3, 2014 (Inventor—David Haub) (6 pages).

* cited by examiner

METHOD AND APPARATUS FOR TRANSMITTER OPTIMIZATION BASED ON ALLOCATED TRANSMISSION BAND

RELATED APPLICATION

This application is a continuation of U.S. patent application Ser. No. 14/696,265, entitled "Method and Apparatus for Transmitter Optimization Based on Allocated Transmission Band," filed Apr. 24, 2015 which is a divisional of U.S. patent application Ser. No. 13/730,127, entitled "Method and Apparatus for Transmitter Optimization Based on Allocated Transmission Band," filed Dec. 28, 2012, issued as U.S. Pat. No. 9,031,567, each of which are hereby incorporated by reference in their entirety.

FIELD

The present disclosure relates to signal processing for wireless communications, and more particularly, some embodiments relate to methods and systems for transmitter optimizations based on information about a frequency band allocated for transmission of a signal.

BACKGROUND

With the ever-increasing prevalence of wireless communications, efficient techniques for signal processing associated with such communications are of great importance. Several emerging wireless communication standards such as WiMax and LTE (Long Term Evolution) have been gaining in prominence, and radio frequency (RF) transceivers are used to transmit OFDMA (Orthogonal Frequency Division Multiple Access) and SC-FDMA (Single Carrier Frequency Division Multiple Access) signals to support such standards. FIG. 1 is an illustration of a typical wireless communication system. A transmitter provides a signal to a transmit antenna 104, which transmits the signal over a channel 106, which may include air. A receive antenna 108 receives the signal and provides it to a receiver 110 for processing. Antennas 104 and 108 may be considered as part of the transmitter and receiver, respectively, in some configurations. Processing that occurs at transmitter 102 prepares an input signal, e.g., by modulating data and preparing the signal for RF transmission. In a typical direct conversion transmitter implementation, a local oscillator (LO) signal is tuned to match a desired RF signal that is intended for transmission, so that the baseband quadrature signal is converted directly to RF. At baseband, digital-to-analog conversion and various other processing stages generate noise and distortion. Filter circuits are commonly provided to address such noise and distortion prior to signal transmission.

SUMMARY

In some embodiments of the present disclosure, first and second inputs are received. The first input indicates a frequency offset of a frequency band allocated for signal transmission. The said allocated band is a subband of a total band available for transmission. The second input indicates a bandwidth of the allocated band. A test is performed to determine whether the frequency offset is greater than a first threshold. Responsive to a determination that the frequency offset is greater than the first threshold, one or more filters of a transmitter of a communications system are controlled to operate cumulatively in a bandpass filtering mode, wherein the frequency offset is within a pass band in the bandpass filtering mode and the pass band is at least as wide as the allocated band. A signal is filtered using the filter(s).

In some embodiments, first and second inputs are received. The first input indicates a frequency offset of a frequency band allocated for signal transmission. The said allocated band is a subband of a total band available for transmission. The second input indicates a bandwidth of the allocated band. One or more filters of a transmitter of a communications system are controlled to operate cumulatively in a lowpass filtering mode, wherein the highest frequency in a pass band in the lowpass filtering mode is less than the highest frequency of the total band available for transmission. A signal is filtered using the filter(s).

In some embodiments, first and second inputs are received. The first input indicates a frequency offset of a frequency band allocated for signal transmission. The said allocated band is a subband of a total band available for transmission. The second input indicates a bandwidth of the allocated band. A local oscillator of a transmitter of the communications system is re-tuned from a first frequency to a second frequency to move spectral content of a carrier-modulated signal to baseband or closer to baseband. One or more filters of the transmitter are controlled to operate cumulatively in a lowpass filtering mode. The signal is filtered using the filter(s).

In some embodiments, a system includes a local oscillator, one or more variable bandwidth filters arranged along a serial processing pathway, a mixer, and a control module. The local oscillator is configured to synthesize a waveform at a variable frequency. Each filter is variably configurable to operate in either a bandpass filtering mode or a lowpass filtering mode, and each filter is capable of being enabled or disabled. The mixer is configured to mix an output of one of the filters based on the waveform synthesized by the local oscillator. The control module comprises a computer readable storage medium including computer-executable instructions stored tangibly thereon. When executed, the instructions cause a processor of the system to perform the operations of: receiving a first input and a second input, wherein the first input indicates a frequency offset of a frequency band allocated for signal transmission, said allocated band is a subband of a total band available for transmission, and the second input indicates a bandwidth of said allocated band; determining whether the frequency offset is greater than a first threshold; and responsive to a determination that the frequency offset is greater than the first threshold, controlling the one or more filters to operate cumulatively in bandpass mode, wherein the frequency offset is within a pass band in the bandpass filtering mode and said pass band is at least as wide as the allocated band.

In some embodiments, a system includes a local oscillator, one or more variable bandwidth filters arranged along a serial processing pathway, a mixer, and a control module. The local oscillator is configured to synthesize a waveform at a variable frequency. Each filter is capable of being enabled or disabled. The mixer is configured to mix an output of one of the filters based on the waveform synthesized by the local oscillator. The control module comprises a computer readable storage medium including computer-executable instructions stored tangibly thereon. When executed, the instructions cause a processor of the system to perform the operations of: receiving a first input and a second input, wherein the first input indicates a frequency offset of a frequency band allocated for signal transmission, said allocated band is a subband of a total band available for transmission, and the second input indicates a bandwidth of said allocated band; and controlling the one or more filters of a transmitter of the communications system to operate cumulatively in lowpass filtering mode, wherein the highest frequency in a pass band in said lowpass filtering mode is less than the highest frequency of the total band available for transmission.

In some embodiments, a system includes a local oscillator, one or more variable bandwidth filters arranged along a serial processing pathway, a mixer, and a control module. The local oscillator is configured to synthesize a waveform at a variable frequency. Each filter is variably configurable to operate in either a bandpass filtering mode or a lowpass filtering mode, and each filter is capable of being enabled or disabled. The mixer is configured to mix an output of one of the filters based on the waveform synthesized by the local oscillator. The control module comprises a computer readable storage medium including computer-executable instructions stored tangibly thereon. When executed, the instructions cause a processor of the system to perform the operations of: receiving a first input and a second input, wherein the first input indicates a frequency offset of a frequency band allocated for signal transmission, said allocated band is a subband of a total band available for transmission, and the second input indicates a bandwidth of said allocated band; determining whether sufficient time remains for retuning a local oscillator of a transmitter of the communications system before a scheduled transmission time; and responsive to a determination that sufficient time remains for retuning the local oscillator before the scheduled transmission time, retuning the local oscillator from a first frequency to a second frequency and controlling one or more filters of the transmitter to operate cumulatively in a lowpass filtering mode.

BRIEF DESCRIPTION OF THE DRAWINGS

The following will be apparent from elements of the figures, which are provided for illustrative purposes and are not necessarily to scale.

DETAILED DESCRIPTION

This description of the exemplary embodiments is intended to be read in connection with the accompanying drawings, which are to be considered part of the entire written description.

Figure 1:
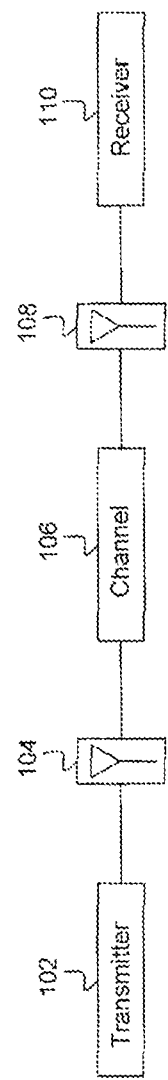
FIG. 1 is an illustration of a conventional communications system.
Figure 2:
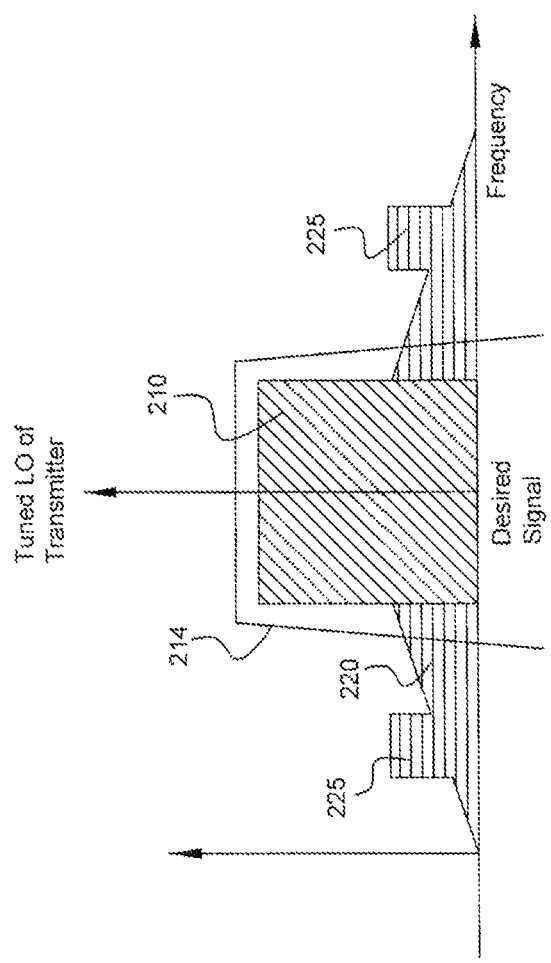
FIG. 2 is an illustration of spectral content at a transmitter for an entire bandwidth usage case.

FIG. 2 is an illustration of a frequency spectrum at a transmitter, e.g., in an OFDMA or SC-FDMA context. In this example, a signal having spectral content 210 that is desired to be transmitted occupies the entire bandwidth that is available for transmission. This signal is shown centered about a tuned local oscillator frequency. Out-of-band generated noise and distortion is shown as 220 in FIG. 1 and may include DAC (digital-to-analog converter) alias components 225. It is desirable to transmit the signal with low out of band noise and distortion, as such noise and distortion that is transmitted outside the used frequency spectrum can degrade overall system performance. For this reason, various devices (e.g., cellular handsets) have to reduce this out of band noise and distortion below specified levels. High-order filters (e.g., having filter characteristic 214 shown in FIG. 2) are typically used to provide steep transitions between pass bands and reject bands in order to transmit the desired signal while at the same time rejecting interference. Such high-order filters having steep transitions are generally complex and expensive.

Figure 3:
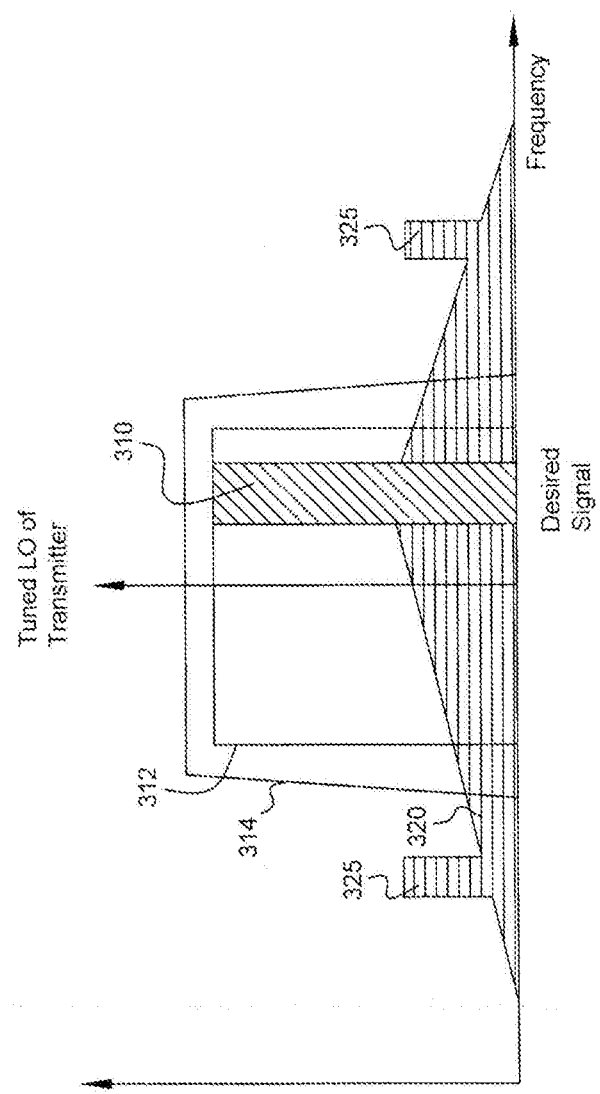
FIG. 3 is an illustration of spectral content at a transmitter for a partial bandwidth usage case.

Another consideration for wireless system operation is that the signal to be transmitted by a particular user may not occupy the entire bandwidth that is available for transmission. For example, FIG. 3 shows a scenario where the desired signal to be transmitted has spectral content 310 which is only a subset of the entire bandwidth denoted by 312. The corresponding unwanted out of band spectral content 320 including alias components 325 are also shown in FIG. 3. Thus, baseband circuits are often designed to transmit the entire bandwidth 312 even if most of the time the particular user is only receiving a signal such as signal 310 that occupies only part of the total bandwidth 312. Typically, prior art architectures have used the same steep-transition filter for the partial bandwidth usage case of FIG. 3 as for the entire bandwidth usage case of FIG. 2, which is an inefficient use of resources.

Various embodiments of the present disclosure address the foregoing inefficiencies by optimizing the transmitter configuration dynamically, e.g., based on dynamic allocation of frequency bands within the total available band.

Figure 4:
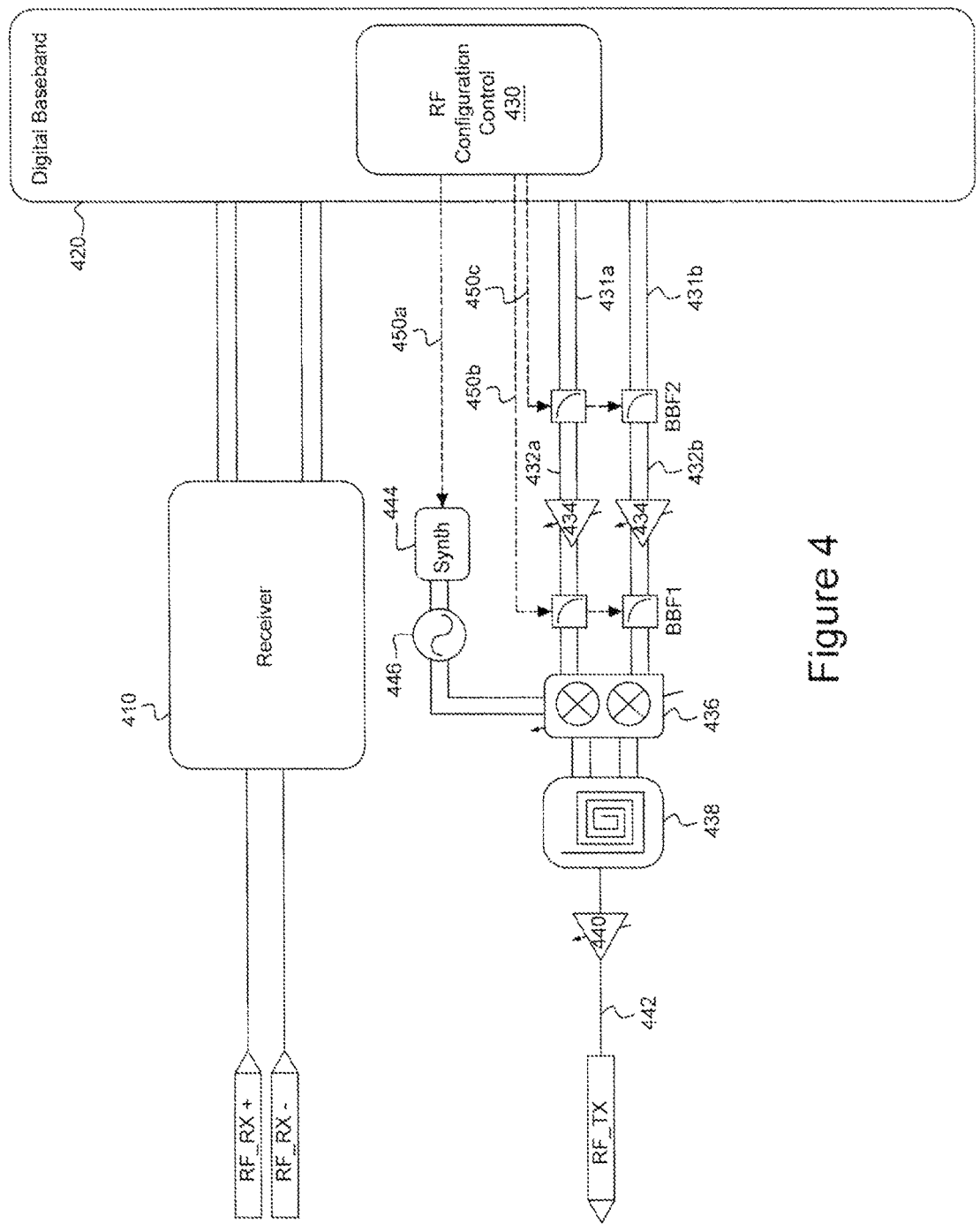
FIG. 4 is a block diagram of a transmitter architecture in accordance with some embodiments of the present disclosure.

FIG. 4 is a block diagram of a transmitter architecture in accordance with some embodiments of the present disclosure. A receiver 410 is shown at the top of FIG. 4, components of a transmitter are shown at the bottom, and a digital baseband module 420 is shown at the right. Various signals are shown as differential signals in FIG. 4, although single-ended implementations may be used as well. An RF configuration control module 430 in the digital baseband module is aware of the bandwidth being used for the desired signal for every allocation (e.g., every OFDMA or SC-FDMA allocation if either of those standards is applicable for the wireless communication system). Based on this information, control module 430 may send control signals 450a, 450b, 450c (generally control signals 450) to program the RF circuitry for efficient transmission. Control module 430 may include a processor and a non-transitory computer readable storage medium having instructions tangibly embodied thereon that, when executed, cause the processor to perform various processing.

Signal 450*a* is sent to a synthesizer RF circuit (local oscillator) 444, which may be tuned so that various frequencies may be transmitted. The generated waveform 446 is provided to a mixer 436, which may include an in-phase mixer component and a quadrature mixer component. The mixer 436 may receive in-phase and quadrature inputs. A balancer 438 and amplifier 440 may be provided to yield signal 442.

One or more filters are provided in the transmitter. FIG. 4 shows an example with two filters BBF1 and BBF2, although other numbers of filter stages are possible. FIG. 4 shows filters (and other components) in in-phase and quadrature processing paths; in some implementations, a single processing path may be provided. The filters are configurable in bandwidth and can also be set to either low pass filter (LPF) or band pass filter (BPF) mode, or they can be selectively bypassed. Control signals 450*b* and 450*c* control the configuration of filters BBF1 and BBF2, respectively. This flexibility in filter settings will allow several configuration options described in Table 1.

TABLE 1

Example filter configuration options

| | BBF1 configuration | BBF2 configuration |
|---|---|---|
| Option 1 | Low Pass | Low Pass |
| Option 2 | Low Pass | Band Pass |
| Option 3 | Band Pass | Band Pass |
| Option 4 | Band Pass | Low Pass |
| Option 5 | Bypass | Low Pass |
| Option 6 | Bypass | Band Pass |
| Option 7 | Low Pass | Bypass |
| Option 8 | Band Pass | Bypass |

The individual configurations of BBF1 and BBF2 determine the overall (cumulative) filter mode of the transmitter, e.g., because configuring any individual filter stage in bandpass mode causes the overall (final) filter response to be bandpass.

Figure 5:
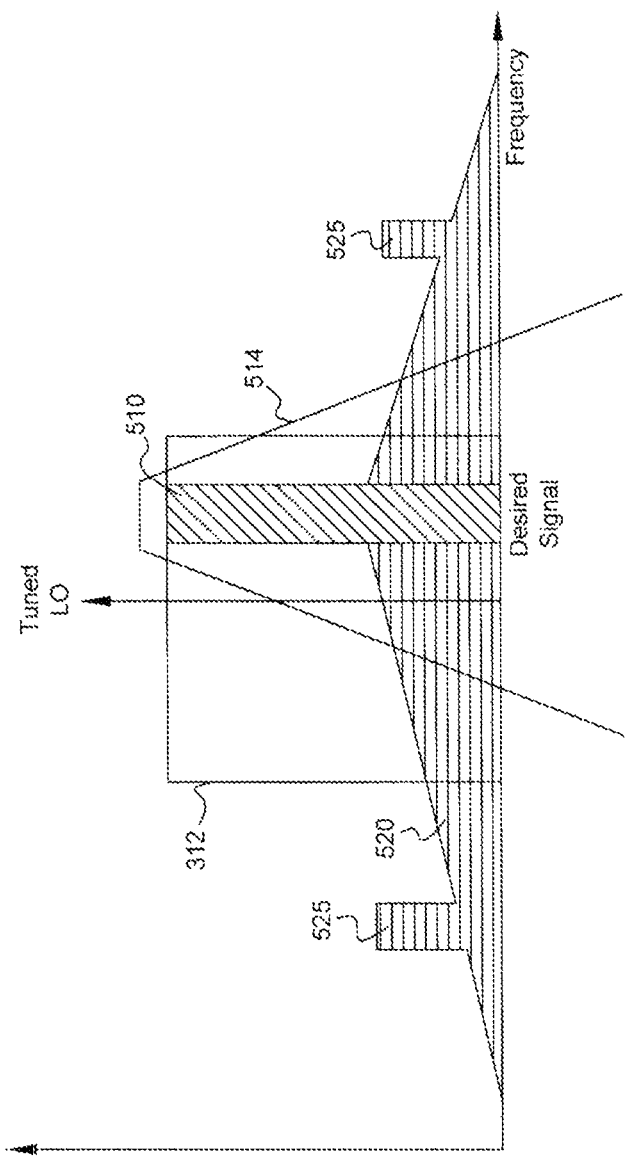
FIG. 5 is an illustration of a frequency response in accordance with one example embodiment.

FIG. 5 is an illustration of a frequency response in accordance with one example embodiment. FIG. 5 shows a frequency content of signal 510 desired to be transmitted, noise/distortion 520, and DAC alias component 525. The frequencies corresponding to region 510 may be referred to as an allocated band, and the center frequency of region 510 may be referred to as a frequency offset $f_{offset}$. As in FIG. 3, frequency content of signal 510 occupies only a portion of the total bandwidth 312. The filter that is cumulatively formed by filters BBF1 and BBF2 may be configured to operate as a bandpass filter. This may be accomplished via options 2, 3, 4, 6, or 8 of Table 1, because when any filter stage is in bandpass mode, the final filter response is bandpass. The filter's bandwidth can be reduced compared to bandwidth of the filter in FIG. 3, and the filter order can also be reduced, as shown by filter characteristic 514, compared to the filter characteristic 314 of FIG. 3. The filter bandwidth can be reduced so that only the frequencies of the desired signal 510 are passed by the pass band of the filter. The reduction in filter order allows potentially less stages of filtering to be used. So, in some embodiments, only BBF1 is used in a bandpass mode to reject the out of band noise, distortion, and/or DAC alias. By reducing the filter order, current drain is saved and distortion to the desired signal 510 is reduced.

Figure 6:
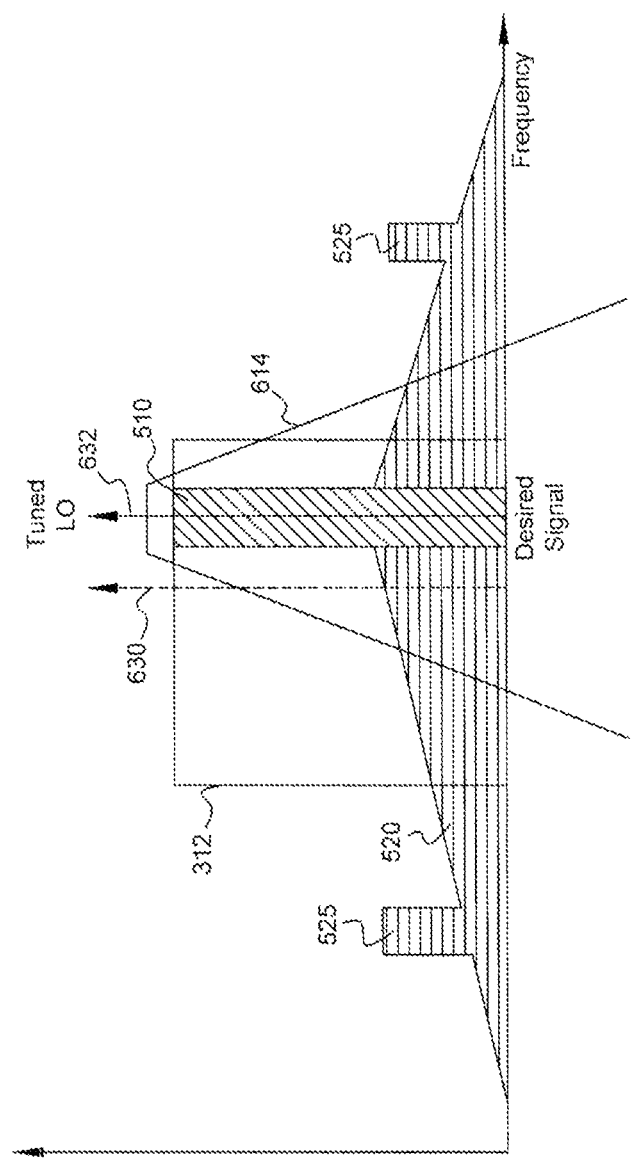
FIG. 6 is an illustration of a frequency response in accordance with another example embodiment.

FIG. 6 is an illustration of a frequency response in accordance with another example embodiment. FIG. 6 shows a frequency content of signal 510 desired to be transmitted, noise/distortion 520, and DAC alias component 525. For this example, the LO (local oscillator) in the RF circuits is retuned to center signal 510 at baseband (i.e., retune to $f_{offset}$) and then a lower order baseband low pass filter (LPF) is used to reject the out of band noise and distortion. Thus, the LO is retuned from frequency 630 to frequency 632. As long as the carrier feedthrough of the RF LO can be adequately reduced, this allows transmission with a lower order filter (lower order than in FIG. 3) having filter characteristic 614, thus yielding the benefits previously described. One of ordinary skill in the art will understand that feedthrough refers to LO signal leakage to the output of the transmitter, which corrupts the transmitter's output signal. Such leakage can result from imperfections (mismatches) of mixer 436 and reduces signal to noise ratio (SNR) of the transmitted signal. In the example shown in FIG. 6, the bandwidth of the lowpass filter is set to the transmission bandwidth, i.e., the bandwidth of signal 510. The lowpass filter of the example of FIG. 6 may be configured by using options 1, 5, or 7 of Table 1 for the individual filters BBF1 and BBF2, since those options involve setting each filter stage to lowpass.

Figure 7:
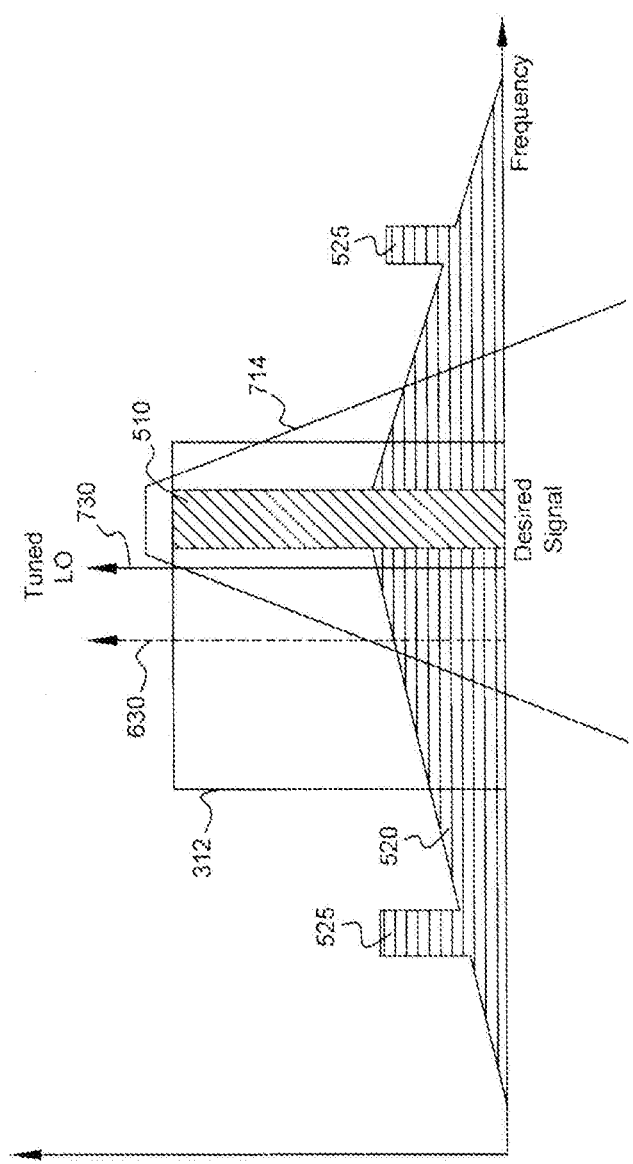
FIG. 7 is an illustration of a frequency response in accordance with another example embodiment.

FIG. 7 is an illustration of a frequency response in accordance with another example embodiment. In this example, the LO is retuned to frequency 730 and a lower bandwidth bandpass filter (BPF) (lower bandwidth than in FIG. 3) is used. For this example, the LO can be retuned so that it does not create LO feedthrough in the allocated band but reduces the frequency offset of the desired signal at baseband. This may be accomplished by retuning the LO to frequency 730 which is less than the lowest frequency of the allocated band. It is also possible to not retune the LO and only change the bandwidth and mode (i.e., change to bandpass mode) of the filter if there is not enough time for retuning the LO before the signal 510 is scheduled to be transmitted. The filter is reconfigured to a lower order (than in FIG. 3) BPF having filter characteristic 714 in order to reject the noise and distortion. Again, this allows transmission with a lower order filter (implementable by options 2, 3, 4, 6, or 8 of Table 1) thus yielding the benefits described above.

Figure 8:
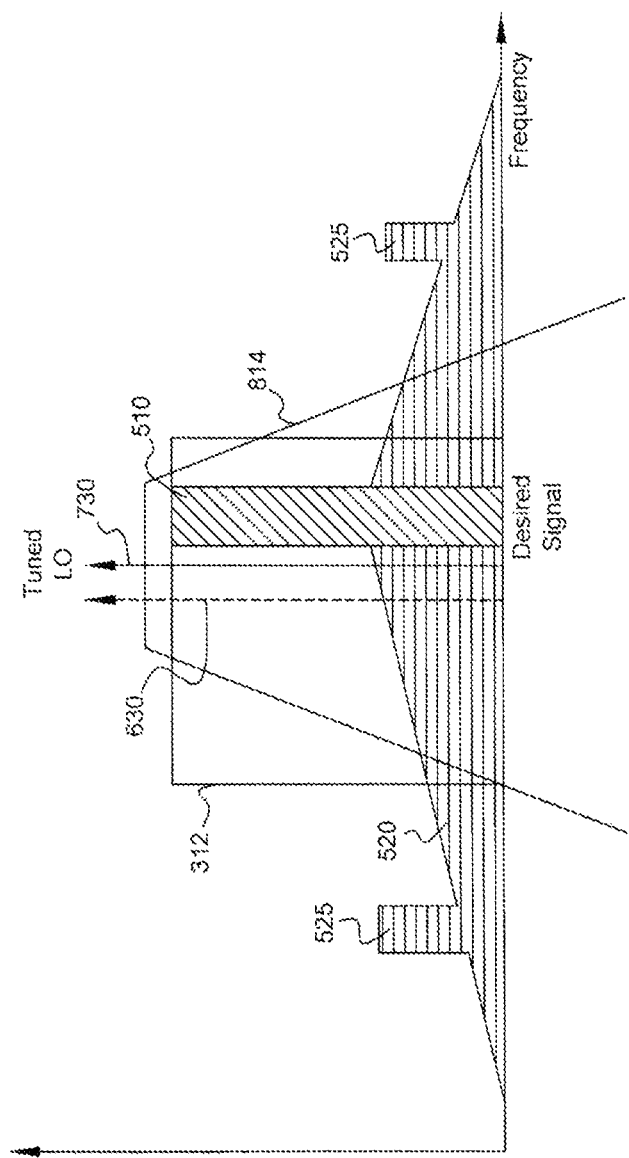
FIG. 8 is an illustration of a frequency response in accordance with another example embodiment.

FIG. 8 is an illustration of a frequency response in accordance with another example embodiment. In this example, the LO is retuned from frequency 630 to frequency 730 and a lower bandwidth LPF (than in FIG. 3) is used. For this case, the LO is retuned so that it does not create LO feedthrough in the allocated band but reduces the frequency offset of the desired signal at baseband. The filter of FIG. 8 may be implemented by options 1, 5, or 7 of Table 1.

Figure 9:
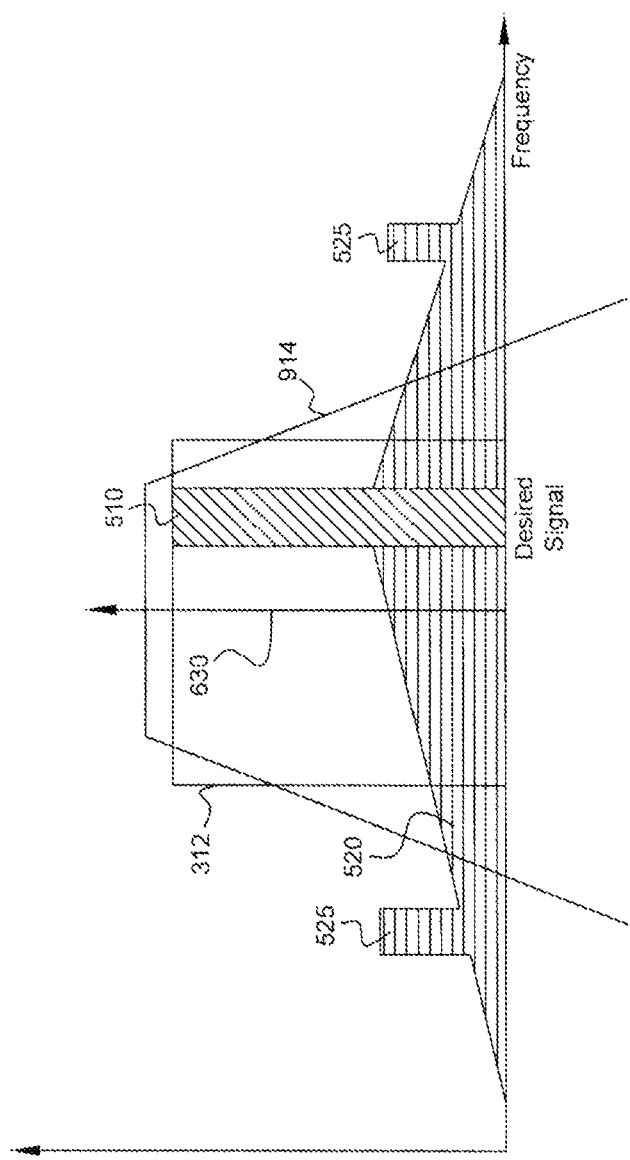
FIG. 9 is an illustration of a frequency response in accordance with another example embodiment.

FIG. 9 is an illustration of a frequency response in accordance with another example embodiment. In this example, the LO is at frequency 630 and is not retuned, e.g., if there is not enough time to retune the LO before the signal is scheduled to be transmitted. The filter is reconfigured to a lower order LPF (lower order than in FIG. 3) in order to reject the noise and distortion. The bandwidth of the filter is lower than in FIG. 3, e.g., with the highest frequency in the pass band of the LPF equaling the highest frequency of the allocated band. Again, this allows transmission with a lower order filter (implementable by options 1, 5, or 7 of Table 1) thus yielding the benefits described above.

The configurations of FIGS. 5-9 may all be achieved using the same hardware and by providing suitable control signals 250. Various advantages and disadvantages of the respective configurations are now described.

The approach of FIG. 5 leaves LO feedthrough at 0 Hz. There is no modulated signal present there (signal 510 does not contain content at 0 Hz) and therefore the emissions requirement is relaxed. The filter bandwidth can be equal to the used bandwidth. LO retuning is not required, which is advantageous because time is required to retune. On the other hand, bandpass filters are more complex to implement than low pass filters, and if the transmission spectrum is at band edge, more current is needed due to the high frequency offset.

Regarding the configuration of FIG. 6, the low pass filter is a simpler implementation than a bandpass filter. The transmitted spectrum may be kept at the lowest possible frequency in the baseband, allowing minimum current drain. The filter bandwidth can be equal to the used bandwidth. On the other hand, LO feedthrough falls inside the modulated signal bandwidth and must be kept low or it will affect the signal quality. And, LO retuning is used, which means there must be enough time to retune before the next transmission.

Regarding the configuration of FIG. 7, LO feedthrough is not inside the modulated signal bandwidth and will not degrade the signal quality. The filter bandwidth can be equal to the used bandwidth. On the other hand, LO feedthrough is not at 0 Hz and must be kept low enough to meet emissions requirements, and the bandpass filter is more complex to implement than a lowpass filter.

In the configuration of FIG. 8, the low pass filter is a simpler implementation than a bandpass filter. LO feedthrough is not inside the modulated signal bandwidth and will not degrade the signal quality. On the other hand, LO feedthrough is not at 0 Hz and must be kept low enough to meet emissions requirement, and the filter bandwidth must be wider than the used bandwidth.

Regarding the configuration of FIG. 9, this configuration is similar to the configuration of FIG. 8 except LO retuning is not needed, which enables this configuration to be used in a situation where there is insufficient time to retune before the next transmission. On the other hand, the filter bandwidth is wider in the FIG. 9 example than in the FIG. 8 example.

Figure 10:
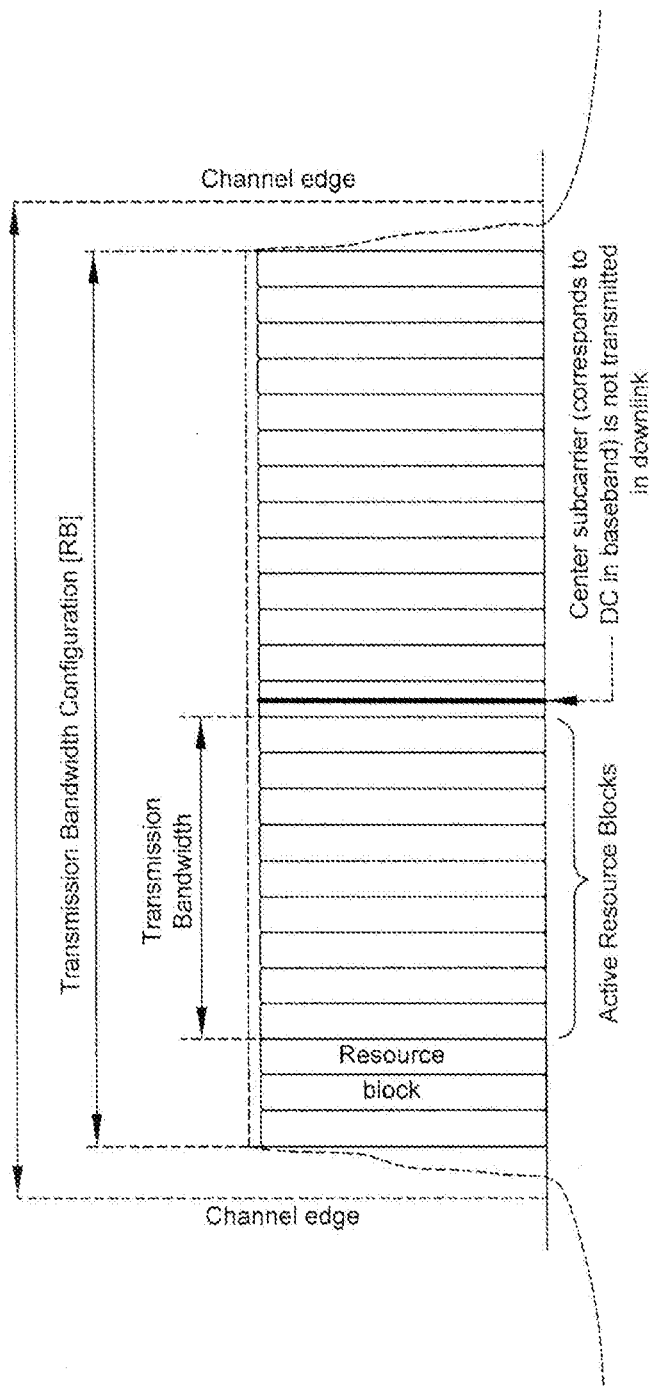
FIG. 10 is an illustration of spectrum allocation which may be used in accordance with some embodiments.

In order to illustrate the operation of the RF configuration control module 430 of FIG. 4, a specific example is now described. This example uses LTE to describe how the RF configuration control may operate. In LTE, the spectrum used for transmission is divided into smaller blocks called resource blocks (RBs) as illustrated in FIG. 10. A group of contiguous RBs are allocated to a particular user which enables the use of the variable transmitter control described herein.

For a specific example, consider the LTE case where 20 MHz of bandwidth is used. Due to the need for a guard band, the actual bandwidth available is 18 MHz, leaving 1 MHz of guard band on each side. For this case, the 18 MHz of bandwidth is divided into 100 RBs with 180 kHz per RB. These RBs can then be assigned to a particular user on a slot by slot basis. There are several example channels described in the 3GPP 36.101 standard document for the 18 MHz case with different RB allocations. These are described in Table 2. The allocation of RBs may determine if reduced filtering can be used and whether some filtering can be bypassed (e.g., whether to disable BBF1 or BBF2).

TABLE 2

Example RB allocations and rejection specifications

| RBs Allocated | Transmission BW, MHz | 3-pole low pass rejection at 61.44 MHz, dB | 1-pole low pass rejection at 61.44 MHz, dB | 3-pole low pass rejection at 30 MHz, dB | 1-pole low pass rejection at 30 MHz, dB |
| --- | --- | --- | --- | --- | --- |
| 1 | 0.18 | 150 | 56 | 150 | 50 |
| 18 | 3.24 | 95 | 32 | 76 | 25 |
| 25 | 4.5 | 86 | 29 | 67 | 22 |
| 50 | 9 | 68 | 23 | 49 | 16 |
| 75 | 13.5 | 58 | 19 | 38 | 13 |
| 100 | 18 | 50 | 16 | 31 | 10 |

Consider a first example where the DAC sample rate is 61.44 MHz. To implement the architecture shown in FIG. 4 with a 1-pole filter for BBF1 and a 2-pole filter for BBF2, different filter configurations may be selected for BBF1 and BBF2 based on the RB allocation in order to reduce the level of the DAC alias. As a specific example, if the amount of rejection required is 29 dB at the DAC alias (located at 61.44 MHz), the RB allocations with transmission BW<4.5 MHz (less than 25 RBs) will allow the system to operate with only BBF1 and bypass BBF2. Another factor in the operation of RF configuration control module 430 is the location of the allocated RBs. The assigned RBs can be anywhere in the transmission bandwidth from near DC to the band edge. This factor may determine whether a bandpass or lowpass filter mode is used for the filter. Again as a specific example, assume that the amount of rejection required is 29 dB at the DAC alias (located at 61.44 MHz). For a 1 RB allocation case, if the RB allocation is located at less than 4.5 MHz then a lowpass filter can used, otherwise a bandpass filter is required.

As another second example, consider the specification for spectral emissions at a 30 MHz offset from the assigned channel. As with the previous example, the architecture in FIG. 4 with a 1-pole filter for BBF1 and a 2-pole filter for BBF2 can be configured based on the RB allocation in order to reduce the baseband noise generated at a 30 MHz offset. As a specific example, if 22 dB filter rejection is needed to reduce this noise, then if the RB allocation is located at less than 4.5 MHz, a lowpass filter can be used. Otherwise, a bandpass filter is used. Another factor in the RF configuration control module is the amount of time available to retune the LO before the transmission. If the time is too short (e.g., less than 30 μsec), then it may not be possible to retune the LO and this will eliminate from consideration using some of the configurations described previously. Specifically, the techniques in FIGS. 6-8 are not possible in that case since LO retuning is assumed for these configurations. The techniques of FIGS. 5 and 9 can be used for this case. In one implementation of the RF configuration control module 430, it is designed that the LO will always be retuned if possible in order to reduce the filtering requirement. So the following three factors may be used by the RF configuration control module 430 (and may be provided as inputs to the control module) in order to optimize the system: (1) Bandwidth (RB allocation); (2) Location of RB allocation in frequency spectrum; (3) Time allowed for LO retuning.

Figure 11A:
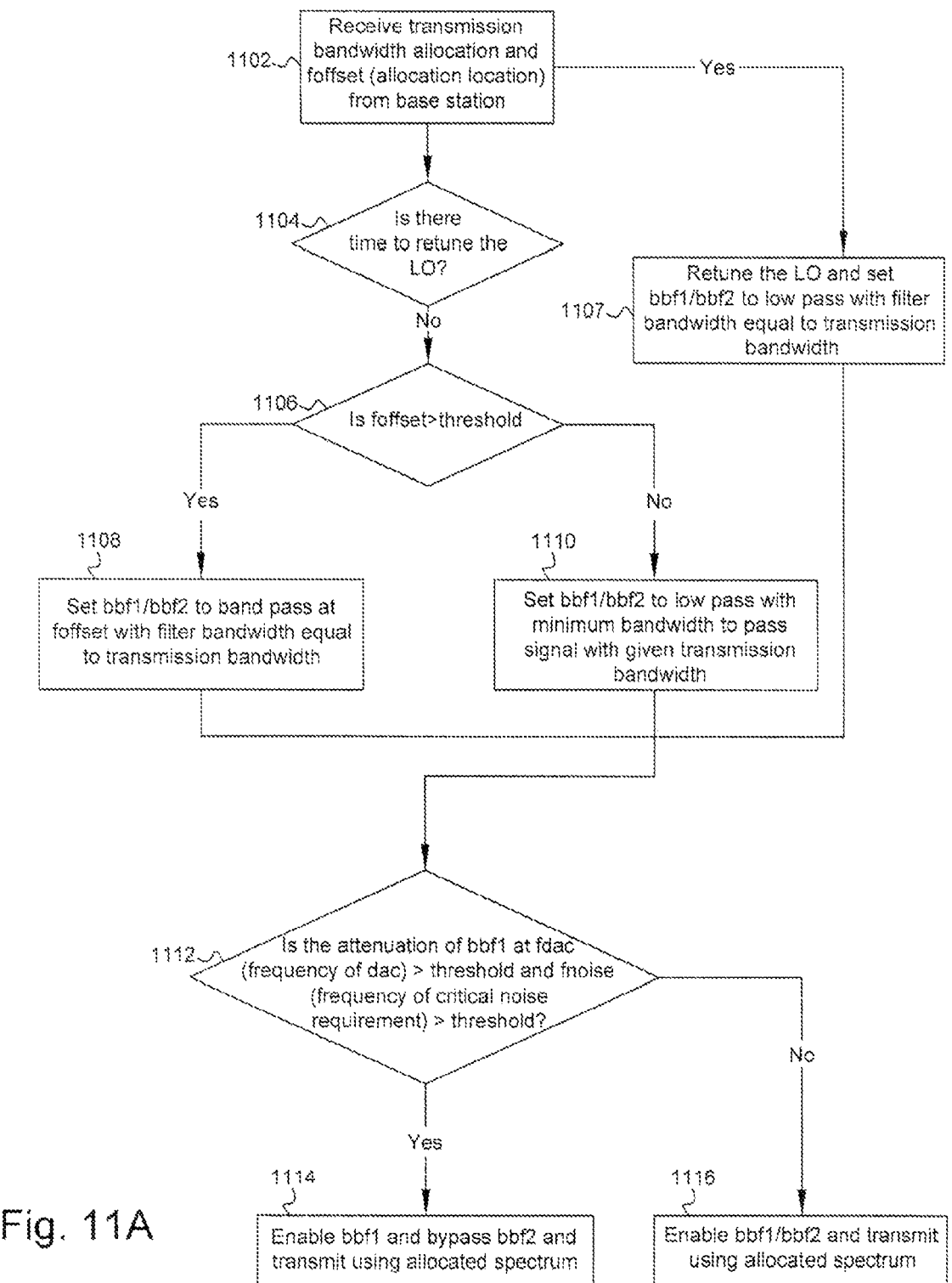
FIGS. 11A-11B are flow charts of example processes in accordance with some embodiments.

FIG. 11A is a flow chart that illustrates how the RF configuration control module 430 may operate using these data in accordance with some embodiments. The flow chart of FIG. 11A is only a depiction of one example implementation. The allocated transmission bandwidth and frequency offset $f_{offset}$ are received (block 1102), e.g., from a base station. A check may be made as to whether there is sufficient time to retune the LO (block 1104). If so, the LO may be retuned, and the filter (e.g., formed by individual filters BBF1 and BBF2) is set to low pass with the filter bandwidth equal to the allocated transmission bandwidth. The LO may be retuned as in FIG. 6 or as in FIG. 8. If the LO is retuned as in FIG. 6, a check may be made as to whether LO feedthrough is unacceptably high (e.g., greater than a predetermined threshold), in which case the LO may be again retuned as in FIG. 8.

If there is not sufficient time to retune the LO, the process may proceed to block 1106, where a comparison is made to check if $f_{offset}$ exceeds a predetermined threshold. If it does exceed the threshold (block 1108), the filter (e.g., formed by individual filters BBF1 and BBF2) is set to bandpass mode at $f_{offset}$ with the filter bandwidth equal to the transmission bandwidth, as in FIG. 5; otherwise (block 1110), the filter is set to lowpass mode with the minimum bandwidth to pass the desired signal with the given transmission bandwidth.

If the attenuation of BBF1 at a predetermined frequency (e.g., the DAC alias frequency $f_{DAC}$ or the frequency of a critical noise requirement) exceeds a predetermined threshold (block 1112), BBF2 may be bypassed (block 1114) as described above, such that only BBF1 is enabled; otherwise, both BBF1 and BBF2 may be enabled (block 1116). The signal is then transmitted using the allocated spectrum.

Figure 11B:
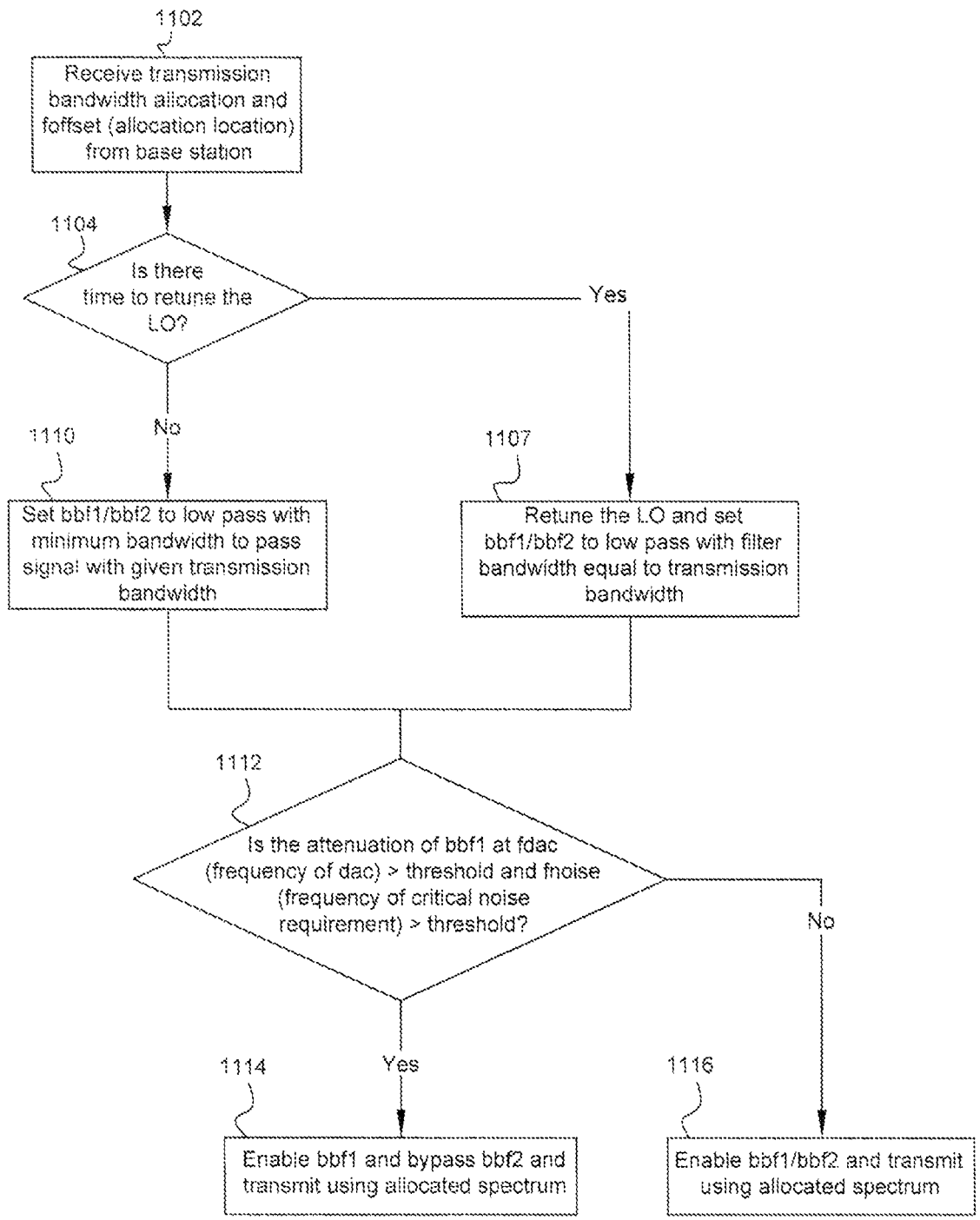

In some embodiments, one or more of the tests 1104, 1106 are omitted. For example, the logic may be programmed to never retune the LO, or to always retune regardless of how much time remains before the next transmission, so that the test at block 1104 can be omitted. As another example, for which a flow chart is shown in FIG. 11B, the logic may be programmed to always perform the functionality of block 1108, or alternatively to always perform the functionality of block 1110, so that the test at block 1106 can be omitted.

Figure 12:
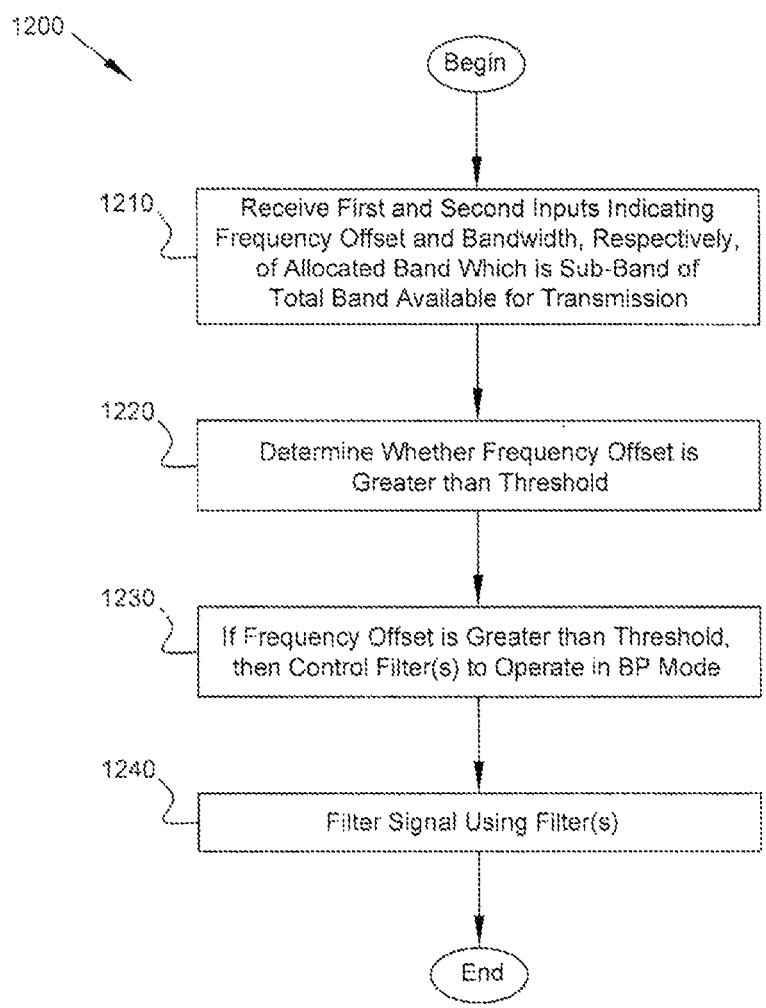
FIG. 12 is a flow chart of another process in accordance with some embodiments.

FIG. 12 is a flow chart of a process in accordance with some embodiments. First and second inputs are received (block 1210). The first input indicates a frequency offset of a frequency band allocated for signal transmission. The said allocated band is a subband of a total band available for transmission. The second input indicates a bandwidth of the allocated band. A test is performed to determine whether the frequency offset is greater than a first threshold (block 1220). Responsive to a determination that the frequency offset is greater than the first threshold, one or more filters of a transmitter of a communications system are controlled (block 1230) to operate cumulatively in a bandpass filtering mode, wherein the frequency offset is within a pass band in the bandpass filtering mode and the pass band is at least as wide as the allocated band. A signal is filtered (block 1240) using the filter(s).

Figure 13:
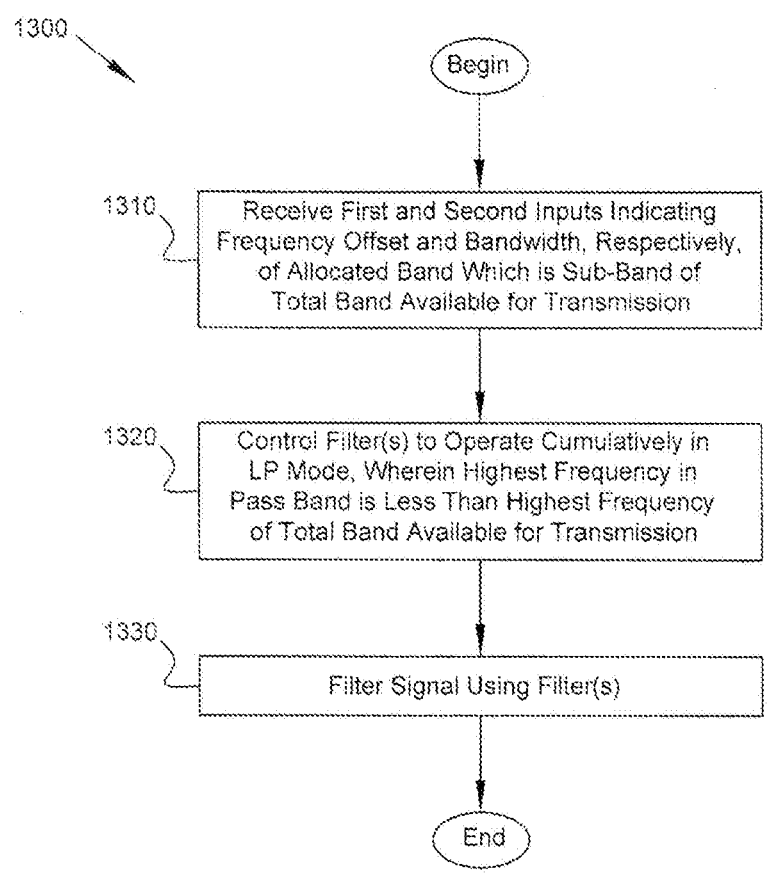
FIG. 13 is a flow chart of another process in accordance with some embodiments.

FIG. 13 is a flow chart of a process in accordance with some embodiments. First and second inputs are received (block 1310). The first input indicates a frequency offset of a frequency band allocated for signal transmission. The said allocated band is a subband of a total band available for transmission. The second input indicates a bandwidth of the allocated band. One or more filters of a transmitter of a communications system are controlled (block 1320) to operate cumulatively in a lowpass filtering mode, wherein the highest frequency in a pass band in the lowpass filtering mode is less than the highest frequency of the total band available for transmission. A signal is filtered (block 1330) using the filter(s).

Figure 14:
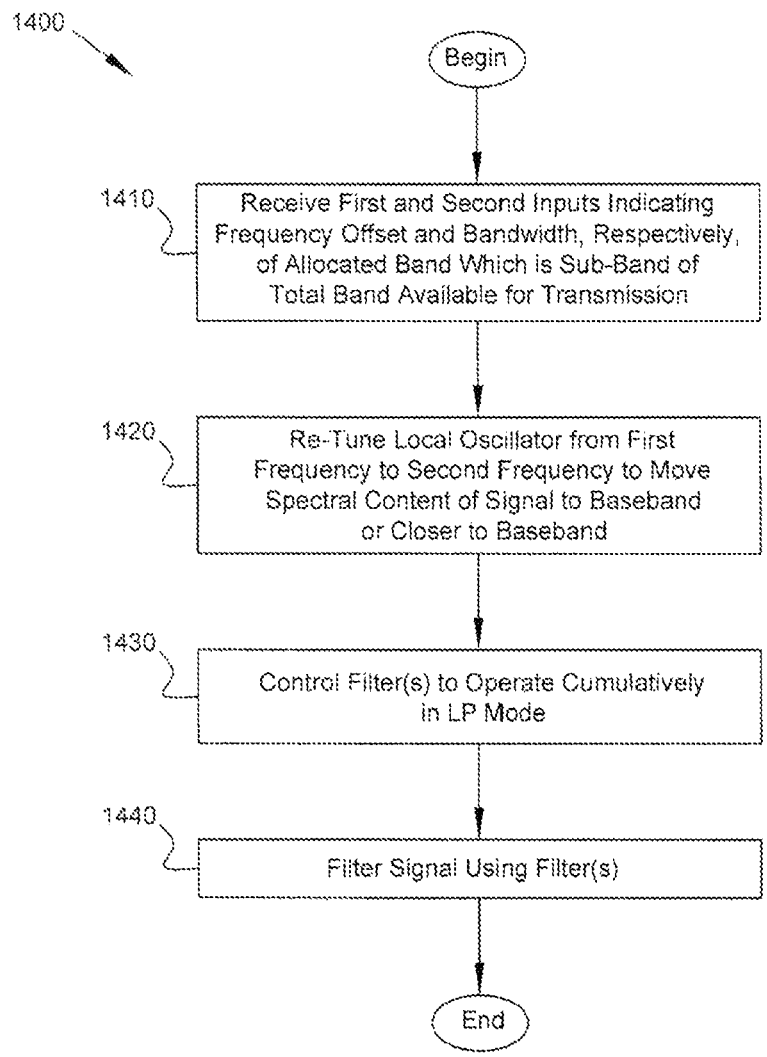
FIG. 14 is a flow chart of another process in accordance with some embodiments.

FIG. 14 is a flow chart of a process in accordance with some embodiments. First and second inputs are received (block 1410). The first input indicates a frequency offset of a frequency band allocated for signal transmission. The said allocated band is a subband of a total band available for transmission. The second input indicates a bandwidth of the allocated band. A local oscillator of a transmitter of the communications system is re-tuned (block 1420) from a first frequency to a second frequency to move spectral content of a carrier-modulated signal to baseband or closer to baseband. One or more filters of the transmitter are controlled (block 1430) to operate cumulatively in a lowpass filtering mode. The signal is filtered (block 1440) using the filter(s).

Thus, various embodiments of the present disclosure use digital baseband awareness of the transmit bandwidth allocation to dynamically adjust the LO, the filter mode (lowpass or bandpass), or both, in order to optimize transmitter performance. The transmitter performance is optimized because a lower order filter with less current drain and less distortion can be used to transmit the signal. Various embodiments are adaptable for optimum transmission of any bandwidth allocation.

Although examples are illustrated and described herein, embodiments are nevertheless not limited to the details shown, since various modifications and structural changes may be made therein by those of ordinary skill within the scope and range of equivalents of the claims.

What is claimed is:

1. A system comprising:
   one or more variable bandwidth filters arranged along a serial processing pathway, wherein each filter is capable of being enabled or disabled;
   a mixer configured to mix an output of one of the one or more filters based on a waveform synthesized by a local oscillator; and
   a control module comprising a non-transitory computer readable storage medium including computer-executable instructions stored tangibly thereon, said instructions when executed causing a processor of the system to perform the operations of:
      receiving a first input and a second input, wherein the first input indicates a frequency offset of a frequency band allocated for signal transmission, said allocated band is a subband of a total band available for transmission, and the second input indicates a bandwidth of said allocated band; and
      controlling the one or more filters of a transmitter of the communications system to operate cumulatively in filtering mode.

2. The system of claim 1, wherein the highest frequency in a pass band in said filtering mode is less than the highest frequency of the total band available for transmission.

3. The system of claim 1, wherein said instructions when executed further cause the processor to:
   determine whether the frequency offset is greater than a first threshold;
   wherein said controlling the one or more filters is performed upon the determination that the frequency offset is not greater than the first threshold.

4. The system of claim 1, wherein each filter is only operable in filtering mode.

5. The system of claim 1, wherein each filter is variably configurable to operate in either bandpass filtering mode or lowpass filtering mode.

6. A method of operating a wireless communications system, the method comprising:
   receiving a first input and a second input, wherein the first input indicates a frequency offset of a frequency band allocated for signal transmission, said allocated band is a subband of a total band available for transmission, and the second input indicates a bandwidth of said allocated band;

controlling one or more filters of a transmitter of the communications system to operate cumulatively in a filtering mode; and filtering a signal using said one or more filters.

7. The method of claim 6, further comprising:

determining whether the frequency offset is greater than a first threshold;

wherein the controlling of said one or more filters is performed upon the determination that the frequency offset is not greater than the first threshold.

8. The method of claim 7, wherein the highest frequency in the pass band in said filtering mode is equal to the highest frequency in said allocated band.

9. The method of claim 7, wherein said one or more filters includes a first filter and a second filter, the first filter configured to filter an output of the second filter either directly or after intermediate amplification, the method further comprising disabling the second filter responsive to a determination that an attenuation provided by the first filter at a first frequency is greater than a first threshold.

10. The method of claim 7, wherein the first and second inputs are received from a base station.

11. The method of claim 7, wherein the highest frequency in a pass band in said filtering mode is less than the highest frequency of the total band available for transmission.

12. A system comprising:

a local oscillator configured to synthesize a waveform at a variable frequency;

one or more variable bandwidth filters arranged along a serial processing pathway, wherein each filter is capable of being enabled or disabled;

a mixer configured to mix an output of one of the one or more filters based on the waveform synthesized by the local oscillator; and a control module comprising a non-transitory computer readable storage medium including computer-executable instructions stored tangibly thereon, said instructions when executed causing a processor of the system to perform the operations of:

receiving a first input and a second input, wherein the first input indicates a frequency offset of a frequency band allocated for signal transmission, said allocated band is a subband of a total band available for transmission, and the second input indicates a bandwidth of said allocated band; and controlling the one or more filters of a transmitter of the communications system to operate cumulatively in filtering mode.

13. The system of claim 12, wherein the highest frequency in a pass band in said filtering mode is less than the highest frequency of the total band available for transmission.

14. The system of claim 12, wherein said instructions when executed further cause the processor to:

determine whether the frequency offset is greater than a first threshold;

wherein said controlling the one or more filters is performed upon the determination that the frequency offset is not greater than the first threshold.

15. The system of claim 12, wherein each filter is only operable in filtering mode.

16. The system of claim 12, wherein each filter is variably configurable to operate in either bandpass filtering mode or lowpass filtering mode.

* * * * *